United States Patent [19]
Lauze, deceased et al.

[11] 4,094,102
[45] June 13, 1978

[54] OSCILLATING CUT-OFF SAW

[76] Inventors: Robert Lavern Lauze, deceased, late of Paramount, Calif.; by Vicki Suzanne Brown, administrator, 5731 Mangrum Dr., Huntington Beach, Calif. 92649

[21] Appl. No.: 788,555

[22] Filed: Apr. 18, 1977

[51] Int. Cl.² .............................................. B24B 27/04
[52] U.S. Cl. ........................................ 51/33 R; 51/47;
   51/35; 125/13 SS
[58] Field of Search ................. 51/34 D, 35, 47, 34 C,
   51/34 G, 33 R, 99; 83/491; 125/13 SS, 14

[56] References Cited

U.S. PATENT DOCUMENTS

| 2,801,458 | 8/1957  | Remmen ...................... | 51/47 X  |
| 2,922,257 | 1/1960  | Else ............................. | 51/34 C  |
| 3,253,368 | 5/1966  | Vekovius ..................... | 51/33 R  |
| 3,451,170 | 6/1969  | Reppenhagen ............. | 51/35    |
| 3,745,713 | 7/1973  | Fabre .......................... | 51/34 C  |
| 3,838,541 | 10/1974 | Durst .......................... | 51/99 X  |
| 3,878,654 | 4/1975  | Wendt ......................... | 51/34 D  |

FOREIGN PATENT DOCUMENTS 2,327,439  12/1973  Germany ................................ 51/99

Primary Examiner—Gary L. Smith
Attorney, Agent, or Firm—Dominick Nardelli

[57] ABSTRACT

A grinding wheel is rotatably mounted on the end of the boom which pivots about a horizontal shaft on its other end. The shaft is suitably mounted on a frame which is disposed thereunder which is, in turn, mounted on a pair of stationary horizontal tracks to enable the frame to move perpendicularly to the shaft. An elevation control hydraulic piston and cylinder assembly is coupled between the boom and frame to rotate the boom upward. A horizontal control piston and cylinder assembly is coupled to the frame and an anchor to move the frame along the tracks. A hydraulic pump provides pressurized liquid to both cylinders through a valving arrangement. The valving arrangement has an automatic timer that alternately supplies pressurized fluid to the head end and to the rod end of the horizontal control cylinder while this cylinder progressively causes the frame to advance along the tracks.

7 Claims, 5 Drawing Figures

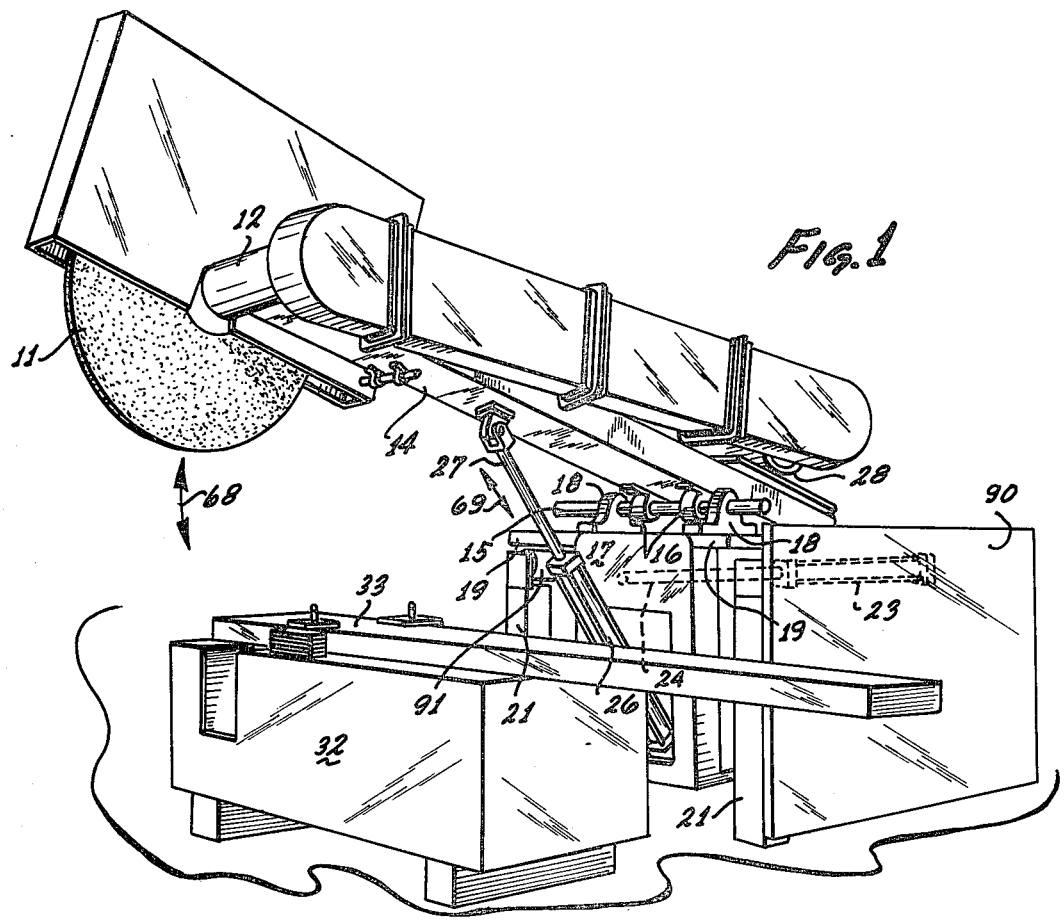
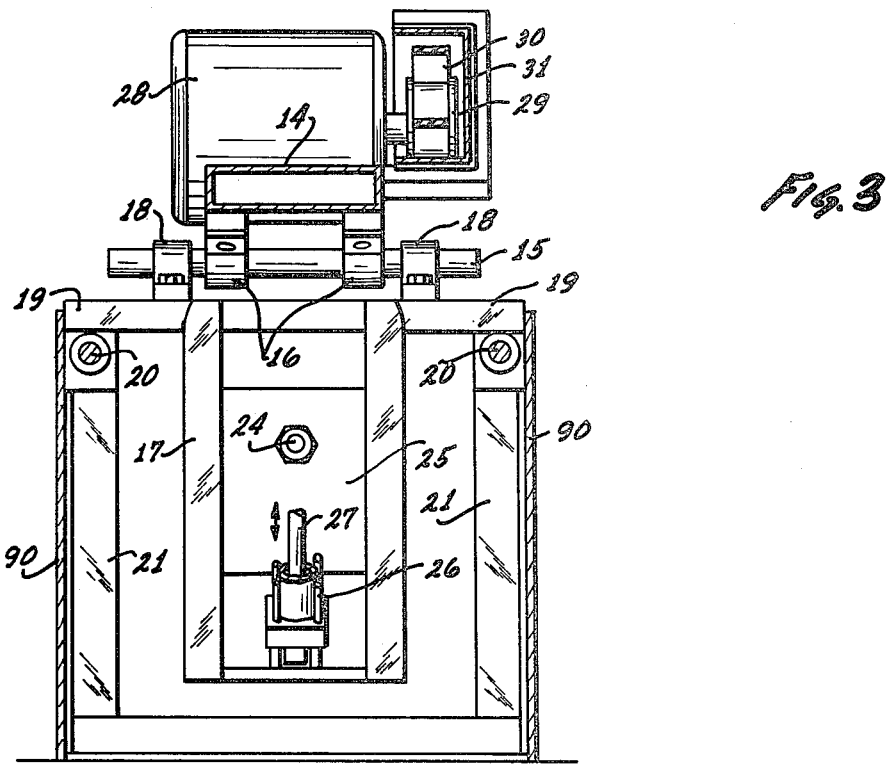

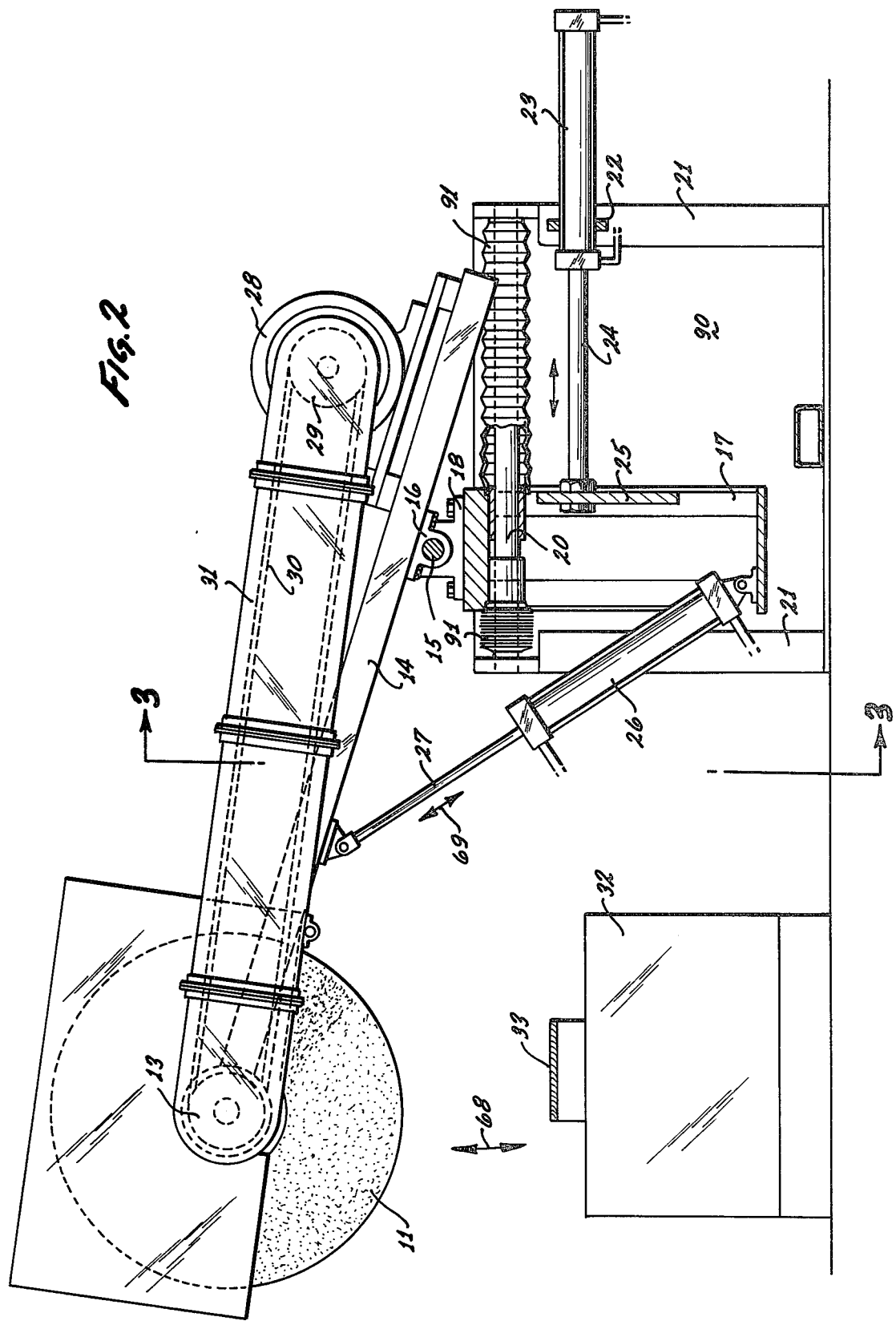

OSCILLATING CUT-OFF SAW

FIELD OF THE INVENTION

This invention relates to a rotating abrasive cut-off saw for cutting through a piece of work and, more particularly, to an oscillating cut-off saw that oscillates towards and away from the work piece.

BACKGROUND OF THE INVENTION

Metal work pieces of relatively large size are difficult to cut and if the metal happens to be of high temperature and high strength alloys, the difficulty is greater. In the past, these alloys, if they happen to be of a type of steel which is burnable, they were cut by use of cutting torches; however, a fairly recent U.S. Pat. No. 3,146,553 teaches the use of a rotating abrasive wheel to cut off large pieces of work. That patent teaches to mount the abrasive wheel on the end of a boom which can pivot up and down at its other end. The wheel turns on a horizontal axis and the work piece is also rotated about another horizontal axis. These two axes of rotation are moved to coincide with each other as the boom pivots on its pivotable end. The apparatus requires a liquid coolant which bathes the wheel and work piece. One can see that since the work piece is required to pivot, the size of the work piece must have an upper limit for any given machine, and machines that are capable of cutting large work pieces inherently require large carriages for the work piece. In addition, one can see that the use of a liquid coolant causes an unsightly mess that is expensive to clean off the work piece and surrounding areas.

OBJECTS OF THE INVENTION

An object of this invention is to provide an abrasive cut-off saw so constructed that it may be used to carry out difficult severing operations quickly and rapidly.

Another object of this invention is to provide a cut-off saw which can cut relatively large work pieces while the pieces are held stationary.

Another object of this invention is to provide a means for automatically oscillating a cut-off saw into and out of a cut in a work piece many times before the piece in cut in two, thereby eliminating liquid coolants.

These and other objects and features of advantage will become more apparent after studying the enclosed preferred embodiment of my invention, together with the appended drawing.

BRIEF DESCRIPTION OF THE DRAWING

FIG. 1 is a pictorial view of the novel apparatus.

FIG. 2 is a side elevation of the apparatus of FIG. 1, with portions broken away for clarity.

FIG. 3 is an elevation section, taken substantially on line 3—3 of FIG. 2.

DETAILED DESCRIPTION OF THE DRAWING

Figure 4:
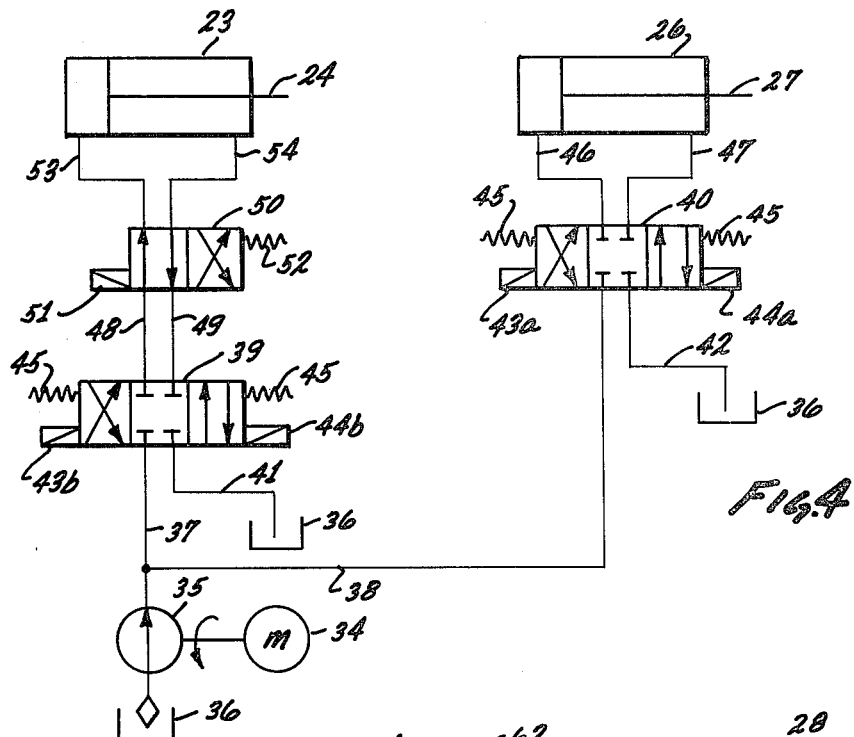
FIG. 4 is a schematic of the piping and valving arrangement for the hydraulic fluid.

Referring to the drawing and to FIG. 1 in particular, there is shown a rotating abrasive wheel or disc 11 made to rotate about a horizontal axis, as defined by a sleeve 12. Within the sleeve 12 is suitably disposed a shaft, not shown, onto which the wheel 11 is mounted at one end, and a pulley 13 (FIG. 2) at the other end. The sleeve 12 is fixed on the end of a boom 14, which, in turn, is supported on an axle 15 by suitable pillow bearing blocks 16. The axle 15 is fixed to a rectangular frame 17 by pads 18. The upper part of the frame 17 has opposing beam sections 19 which have their respective ends journaled on a pair of horizontal tracks or rods 20 (FIGS. 2 and 3). The rods 20 are fixed stationary at their respective ends by uprights 21, which are, in turn, suitably fixed to the floor. Items 90 serve as cover plates and items 91 are bellows for dust covers. Across the two rear uprights 21 removed from the saw 12 is a crossbrace 22 onto which is suitably fixed a cylinder 23 of a horizontal control hydraulic piston and cylinder assembly, which has a piston rod 24 engaging the frame 17 by a plate 25. To lift the boom 14, a cylinder 26 of a vertical control piston and cylinder assembly is suitably mounted to the frame 17, while a piston rod 27 is suitably mounted to the boom. The boom 14 also supports an electric motor 28 preferably mounted on the other side of the pivot axle 15 to counterbalance the weight of the abrasive wheel 11. The motor has a pulley 29 onto which an endless belt 30 is mounted which also engages the pulley 13. The endless belt 30 is enclosed by a safety casing 31. A table 32 is provided to support a work piece 33 stationary. One can see that the size of the work table 32 is not limited by the size of my novel cut-off apparatus, because if a large piece is to be cut, the lower table would be used.

Referring to FIG. 4, the piping diagram for my system will now be explained. A motor 34 and pump 35 are provided to pump liquid from a reservoir 36. The liquid leaves the pump 35 under pressure through two branch pipes 37 and 38 to two separate three-way valves 39 and 40, respectively. From each valve 39 and 40 are discharge pipes 41 and 42 which discharge the returning liquid to the reservoir 36. Each valve 39 and 40 blocks the flow of liquid into and out of the valves, passes the liquid straight through when suitable solenoids 43a and 43b are actuated to bring the right side (as viewed) of each valve into alignment with pipes 37 and 41, or pipes 38 and 42; and passes the liquid in a cross-over pattern when suitable solenoids 44a and 44b are actuated to bring the left side of each valve into alignment with pipes 37 and 40, or pipes 38 and 42. Items 45 are springs that return the valve into its block flow position when neither solenoid is actuated. From valve 40, two additional pipes 46 and 47 are coupled to couple liquid to the head end and to the rod end of the cylinder 26, respectively. From valve 39 are coupled two pipes 48 and 49 to couple liquid to a two-way valve 50. The valve 50 is somewhat similar to valves 39 and 40, but does not have the block flow feature, and has only one solenoid 51 and a return spring 52. From valve 50 are two more pipes 53 and 54 to couple liquid to the head end and to the rod end of cylinder 23, respectively.

Figure 5:
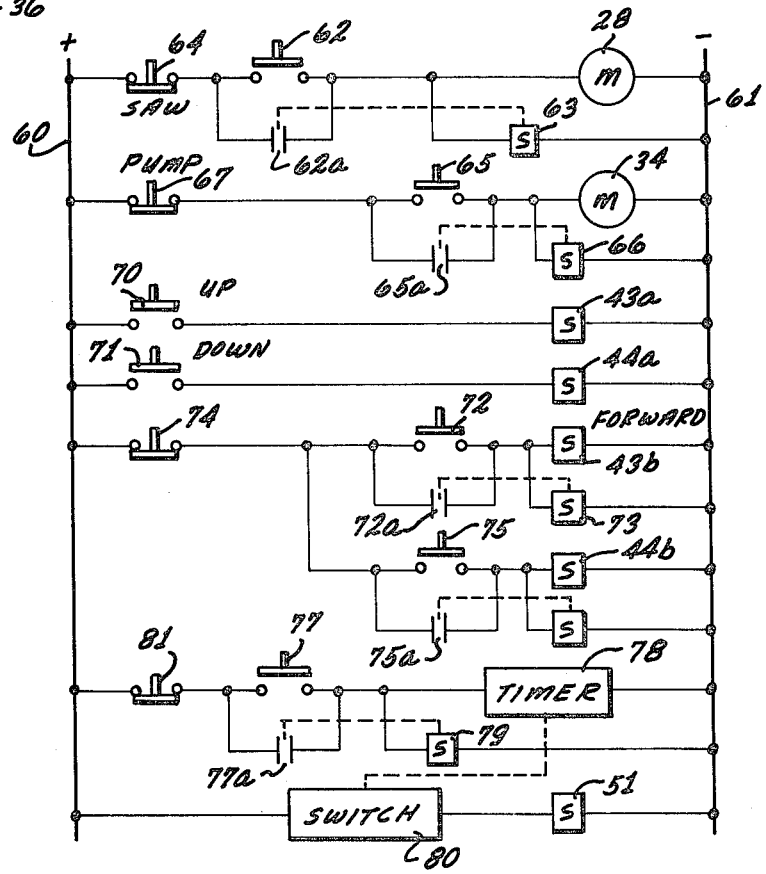
FIG. 5 is a schematic of the electrical control circuit.

Referring to FIG. 5, there is shown a typical electric control circuit in schematic to operate my saw with an oscillating motion. The circuit shows two leads 60 and 61, that are coupled to a power supply, not shown. The saw motor 28 is started by pushing a start button 62 which actuates the motor 28 and a solenoid 63, which in turn holds contacts 62a closed. The motor is stopped by pressing button 64. The motor 34 which supplies hydraulic pressure for the piping system is started by pushing button 65 which also actuates a solenoid 66 to hold contacts 65a closed. This motor is stopped by pressing button 67.

The saw 11 is raised or lowered as indicated by the double-headed arrows 68 and 69 in FIG. 2, by pressing buttons 70 and 71, respectively. Button 70 actuates solenoid 43a (see FIG. 4) to allow pressurized liquid into the head end of piston 26 while button 71 actuates the other solenoid 44a to allow pressurized liquid into the rod end of the cylinder. One can see that the saw 11 only moves while the operator keeps either button 70 or 71 depressed. The saw is moved forward toward the work piece 33 when button 72 is depressed to energize the solenoid 43b and another solenoid 73 to close contacts 72a. Forward motion is stopped by depressing button 74. The saw is moved back from the work piece by depressing button 75 to energize the solenoid 44b and another solenoid 76 to close contacts 75a. The motion is also stopped by depressing button 74. As mentioned above, one feature of this saw is that it can be made to oscillate in its horizontal movement so that the saw can back away from the work piece to enhance the cutting action. Oscillating motion in the forward movement is obtained by depressing button 72 and button 77. Button 77 energizes a timer 78 and the solenoid 79. The solenoid 79 closes contacts 77a. The timer 78 actuates a switch 80 in an on-off cycle. When switch 80 is on the on cycle, the solenoid 51 is energized, actuating valve 50 to cause pressurized fluid to enter the rod end of cylinder 23 to back up the disc 11. Conversely, when switch 80 is in the off cycle, the valve 50 returns to its position shown in FIG. 4 to allow for forward movement of disc 11. One can see that the off time of timer 78 should be slightly longer than the on time to allow gradual forward motion of the saw. One can see that if button 75 is depressed before button 77 was depressed, an oscillating motion is available in the backward movement of the saw. This oscillating motion is stopped by depressing button 81.

The saw is operated as follows: Work piece 33 is suitably anchored on the table in front of the saw so that the line of cut is aligned with the disc 11. The disc 11 is retracted or backed up from the work piece and lowered so that the circumferential edge thereof is the desired distance below the surface of the work piece. The saw and hydraulic system are started and the saw is made to move forward at the same time the oscillating button 77 is depressed. The saw digs into the work piece and then retracts. During the retraction, any heat generated is allowed to be conducted away. Thus one finds that the work piece and saw remain relatively cooler without the addition of a forced liquid by using the oscillating motion.

Having described the preferred embodiment of my invention, one skilled in the art, after studying the above description, can devise other embodiments without departing from the spirit of my invention. Therefore, my invention is not to be considered as limited to the disclosed embodiment, but includes all embodiments falling within the scope of the appended claims.

I claim:

1. A power saw comprising:
   a stationary bed having four upright posts, two of which are disposed at the two rear corners of a rectangle and the other two at the forward corners;
   a pair of parallel and horizontal disposed rods, each of which is mounted by its ends near the top of two of said posts so that said rods extend fore and aft;
   a relatively narrow frame having a top edge and a pair of opposing and alligned beams extending outwardly from said frame at said top edge thereof;
   a pair of bearing means, each of which is fixed to one of said beams and make sliding 360° bearing contact around and with a respective one of said rods so that said frame depends from and between said rods;
   a horizontally disposed axle mounted on the top edge of said frame and disposed perpendicularly to said rods;
   a boom mounted on and disposed to rotate about said axle so that one end of said boom extends forward of said axle and the other end extends rearwardly of said axle;
   a rotatable saw, rotatably mounted on the forward end of said boom;
   a motor mounted on the rear end of said boom and having means for coupling energy to said saw to rotate said saw;
   a first fluid piston and cylinder assembly, horizontally disposed and having one end directly engaging said frame and the other end fixed to said stationary bed for moving said frame along said rods; and
   a second fluid piston and cylinder assembly having one end coupled to said boom and the other end coupled to said frame near the lowest portion thereof for maximum vertical movement of said saw by maximum stroke of said second assembly.

2. The saw of claim 1 wherein:
   said other end of said first fluid assembly is fixed to the rearwardly disposed upright post, and
   said one end of said second assembly is coupled to said boom forward of said axle.

3. The saw of claim 1 wherein:
   means are provided for oscillating the movement of said frame along said rods as said frame is progressively moving in the forward direction.

4. The saw of claim 3 wherein:
   said fluid in said first and second fluid assemblies is a liquid.

5. The saw of claim 2 wherein:
   means are provided for oscillating the movement of said frame along said rods as said frame is progressively moving in the forward direction away from said bed.

6. The saw of claim 5 wherein:
   said fluid in said first and second assemblies is a liquid.

7. The saw of claim 6 wherein:
   said means for oscillating comprises:
   a source of pressurized fluid,
   means for coupling said pressurized fluid to said first fluid assembly and in particular to the head end of the cylinder thereof and to the rod end thereof,
   a valve means interposed within said means for coupling alternating said pressurized fluid between the head end and the rod end.

* * * * *